United States Patent [19]

Clapp

[11] 4,319,689
[45] Mar. 16, 1982

[54] STORAGE RACK

[75] Inventor: Daniel W. Clapp, Hackettstown, N.J.

[73] Assignee: Frazier Industrial Company, Long Valley, N.J.

[21] Appl. No.: 63,580

[22] Filed: Sep. 13, 1979

[51] Int. Cl.³ .............................................. A47F 5/00
[52] U.S. Cl. ................................... 211/182; 211/134; 52/650
[58] Field of Search .................. 211/182, 134; 52/650

[56] References Cited

U.S. PATENT DOCUMENTS

| | | | |
|---|---|---|---|
| 1,359,987 | 11/1920 | Hamilton | 211/182 |
| 2,894,641 | 7/1959 | Edwards, Jr. | 211/182 |
| 2,984,363 | 5/1961 | Lang et al. | 211/182 |
| 3,142,386 | 7/1964 | Skubic | 211/182 |
| 3,337,061 | 8/1967 | Caudell | 211/134 |
| 3,391,795 | 7/1968 | Finlayson | 211/134 |
| 3,650,081 | 3/1972 | McCracken | 52/650 |
| 3,802,574 | 4/1974 | Weider | 211/134 |
| 3,929,229 | 12/1975 | Pamer | 211/134 |

Primary Examiner—Victor N. Sakran
Attorney, Agent, or Firm—Joseph W. Molasky & Assoc.

[57] ABSTRACT

A high-rise storage rack is constructed of a plurality of vertical frames each having a front and rear column with the rear columns of the vertical frames being interconnected by means of down-aisle ties to brace the same against down-aisle forces and lateral column buckling. The front columns are supported against down-aisle forces and lateral column buckling by means of braced frame assemblies whereby there is no need for any down-aisle ties between the front columns of the vertical frames. Thus, the entry for a shuttle table or other pallet engaging mechanism of an automated storage and retrieval system is totally unobstructed and there is a minimum of unused storage space in the vertical direction between the storage areas.

7 Claims, 6 Drawing Figures

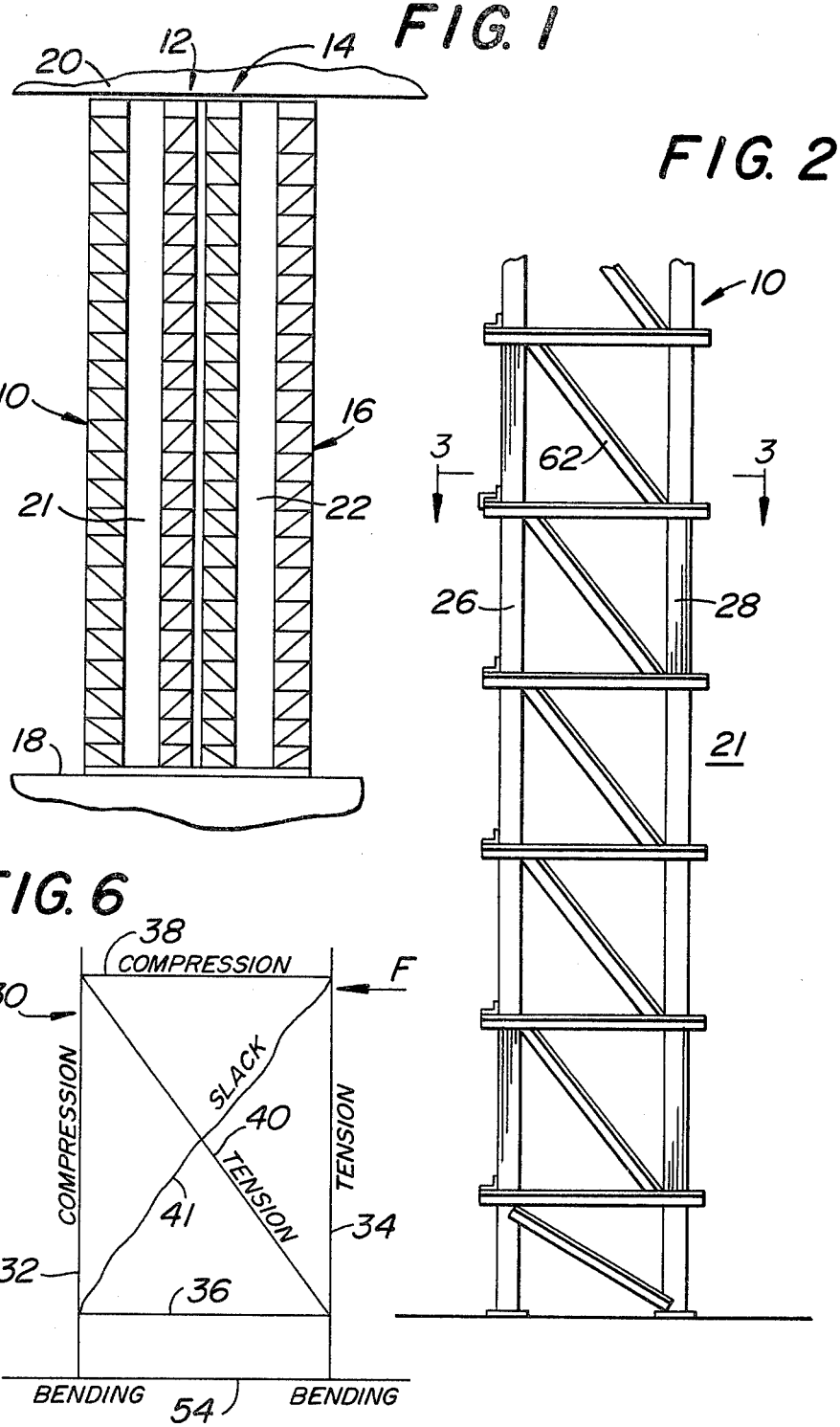

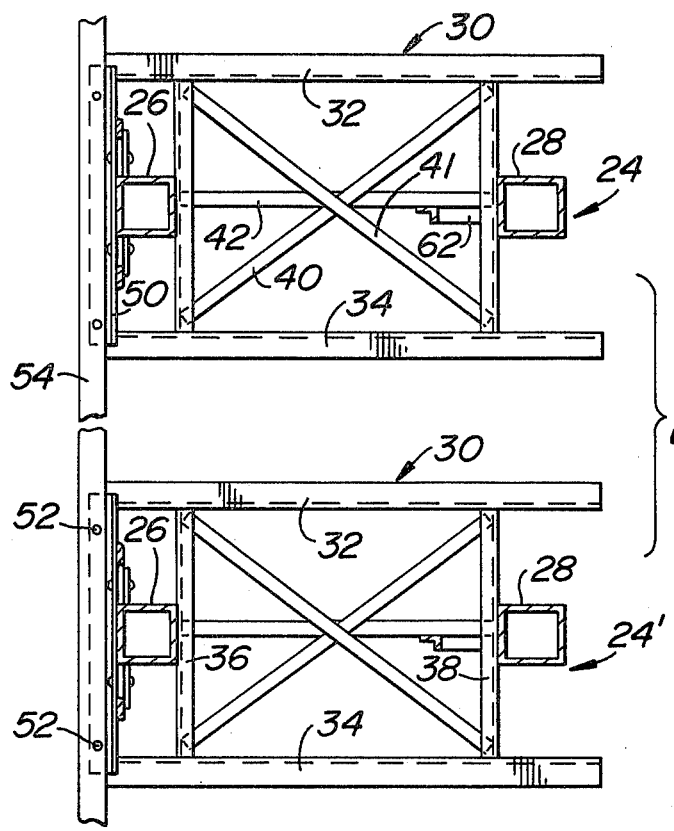
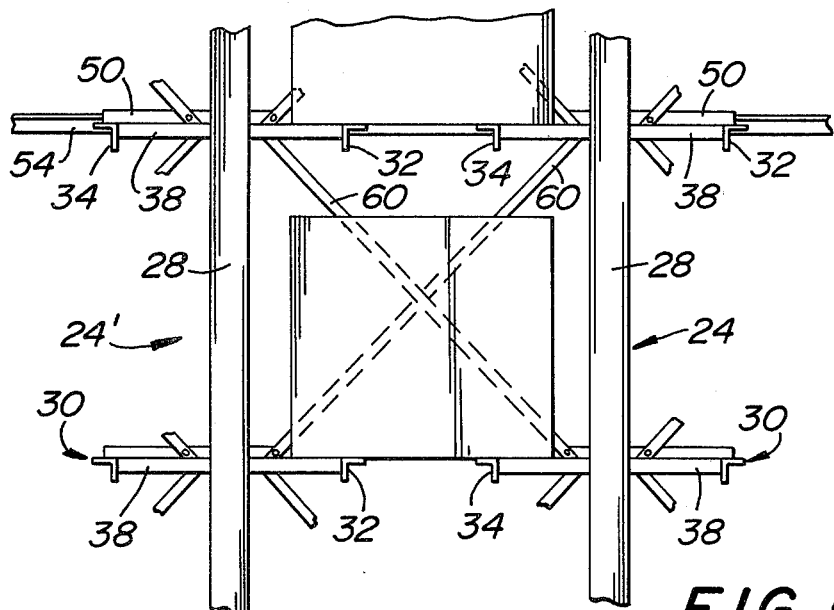

STORAGE RACK

BACKGROUND AND SUMMARY OF THE INVENTION

This invention relates to storage racks and, more particularly, to high-rise storage racks, also known as Automatic Storage and Retrieval System racks (AS/RS racks). In the art, high-rise storage racks generally involve a structure of great height such as from 50–100 feet and comprise upright frame assemblies provided with suitable bracing and down-aisle tie means. High-rise racks also generally comprise a pallet support arrangement of the type used in "drive-in" and "drive-through" racks. These last-mentioned racks generally comprise two groups of upright frames placed one pallet apart with pallet load rail supports attached to the frames. The load rails upon which the pallets rest run from front to rear and support the pallets so as to enable the placing of pallets one in back of the other over the entire length of the load rails.

High-rise racks are also generally provided with a special automated storage and retrieval system which comprises mechanism for engaging the pallet on its underside for handling the same. These special systems generally comprise a so-called shuttle table which moves through the aisle and into a storage area from the aisle to engage the pallet on the bottom surface thereof. The shuttle table is usually 4–6 inches or more deep and places a load down on the rails. These rails leave the center area under the pallet free and clear for the movement of the shuttle table lifter.

Conventional high-rise racks use a series of down-aisle ties for innerconnecting and bracing both the front and rear columns of the upright frames at the same elevation. The front and rear columns are tied together at a plurality of levels in the rack structure in the longitudinal or down-aisle direction. These ties are then diagonally braced from the front end of the rack to the rear thereof and are diagonally braced to the floor in the rear plane. In the conventional practice of the prior art, it has been considered that this arrangement involving innerconnecting the front and rear columns of the frames by means of down-aisle ties is a most effective way of stabilizing the rack structure against down-aisle forces and to enhance the buckling resistance of the front columns.

On the other hand, there are serious disadvantages to the above-described bracing scheme. A major disadvantage is that the bracing arrangement of the prior art utilizes more space vertically than is necessary because of the nature of the handling equipment. The reason for this excess vertical space requirement is that there must be clearance above each stored load to the nearest obstruction to allow for the storage retrieval means to lift the load clear of the load supports prior to removing it from the rack. Typically, this clearance is about 3 or 4 inches above the top of each load. Also, under each load there must be room for the shuttle table of the automated storage and retrieval system to enter the rack structure sufficiently beneath the pallet so as to avoid contact with the pallet and also to subsequently raise and bring the pallet out of the rack structure. Typically, this clearance is about 7 to 9 inches. Because of the provisions of a down-aisle tie in the front end of the rack structure, the two clearances discussed above must be added together, and, in addition thereto, additional clearance must be allowed for the down-aisle tie member itself. On the other hand, the two clearances discussed above may be combined together (i.e., overlap) if there is no obstruction (such as a down-aisle tie) in the vicinity of the clearance window through which the storage retrieval system must operate. In a typical rack construction, the extra space required by reason of the use of a single down-aisle tie at a particular level may amount to as much as 6–8 inches of vertical clearance.

If a high-rise rack is to be installed inside a building that has a separate structural support system for the walls and roof, and therefore is limited to the available headroom, it is possible to use up one vertical load opening space just by the necessity of the extra down-aisle clearances of the prior designs. In a large system this can mean that as much as ten percent of the available volume for storage is lost because of the use of a down-aisle tie bracing system of the type used in the prior art. In the storage rack in accordance with the invention, the above-discussed problem of lost storage space is avoided by the use of a system of bracing the front column against the down-aisle forces and lateral column buckling without using a front end down-aisle tie member. This novel design eliminates the need for the extra clearances required and as discussed above, this novel bracing arrangement can substantially increase the storage capacity of any storage building. Moreover, this can be achieved without substantially increasing the steel required in the structure.

The columns in a high-rise storage rack generally represent fifty percent or more of the entire structure and those columns are directly proportional by weight and cost to the frequency from base to top with which they are tied. Lateral, or down-aisle, ties give lateral or down-aisle support to the columns. While more ties provide more support to the columns and reduce the cost, each down-aisle tie adds a minimum of 5 or 6 inches to the height of the rack or else reduces the number of units high within the fixed height available in the storage building as discussed above. By reason of the design in accordance with the present invention, lateral or down-aisle support for the column is added at every load level while at the same time leaving the entryway for the shuttle table under each load totally unobstructed. As an example, in the prior art conventional high-rise storage racks, there may be provided 11 loads high with 4 down-aisle ties under a 50 foot ceiling. By reason of the design in accordance with the invention it is possible to provide a twelfth load high under the same 50 foot ceiling by eliminating all the front down-aisle ties and supporting the columns down-aisle at 12 points instead of 4. Moreover, this provides a better and less costly storage system and because the columns are supported 12 times instead of 4 times, it is possible to save about one-third of the weight of the columns. Also, the adding of a twelfth-load high can increase the storage area nearly ten percent.

Briefly stated, the storage rack in accordance with the invention involves a system of bracing the front column against down-aisle forces and lateral buckling without using a front down-aisle tie member thereby eliminating the need for the extra clearances discussed above. The bracing scheme in accordance with the invention utilizes the load support arm rail sub-assembly with minor additions of cross or diagonal bracing within the sub-assembly to brace the front column from the back plane. Thus, the above-discussed advantages are achieved by the relatively simple expedient of changing the bearing rail assembly into a two-purpose bearing rail and brace frame assembly. Thus, the bearing arms and bearing rails are each doing double duty of both supporting the load to be stored and also resisting the down-aisle loads and forces that must be accommodated in every properly engineered rack structure.

The storage rack design in accordance with the invention has the additional benefit that it allows the front column of the frames to be braced in an economical manner at every level. This increases its strength substantially and, as an example, would permit, without significantly increasing the required amount of steel, increasing the capacity of a given column by as much as thirty-three percent over the conventional framing method.

A further advantage of the storage rack design in accordance with the invention is that it allows an easier erection procedure to be utilized. When the frames are erected, they are typically erected between a front and rear down-aisle tie protruding from the end of the already standing frames. This means that the frame being added must be threaded in between the front and rear down-aisle tie before it can be bolted in place. If there are no front down-aisle ties, it simplifies the erection in that the workmen will only have to match the frame with a rear down-aisle tie and have all the aisle clearance in front of the rack to work with in installing upright frames.

Another feature of the invention is that by eliminating the front down-aisle ties, more space is available for locating the sprinkler piping of a sprinkler system. In the prior art devices, there was often a conflict between the sprinkler piping and the front down-aisle ties and the horizontal cross braces.

Another advantage of the design in accordance with the invention results from the fact that the front down-aisle ties of conventional designs are normally constructed in front of the posts and become the first part of the rack encountered by a malfunctioning stacker and load means. By eliminating the front down-aisle tie assemblies, greater clearance can be provided to accommodate errant movement of the stacker and load means.

BRIEF DESCRIPTION OF THE DRAWINGS

FIG. 1 is a diagrammatic view in side elevation of a high-rise storage rack in accordance with the invention;

FIG. 2 is a detail view in side elevation of one row of frames for the storage rack shown in FIG. 1;

FIG. 3 is a fragmentary plan view taken generally on line 3—3 of FIG. 2;

FIG. 5 is a fragmentary front elevation of a portion of a storage rack in accordance with the invention showing a storage area between two frames; and FIG. 6 is a force distribution diagram of a braced frame assembly in accordance with the invention.

DETAILED DESCRIPTION OF THE PREFERRED EMBODIMENT

Figure 4:
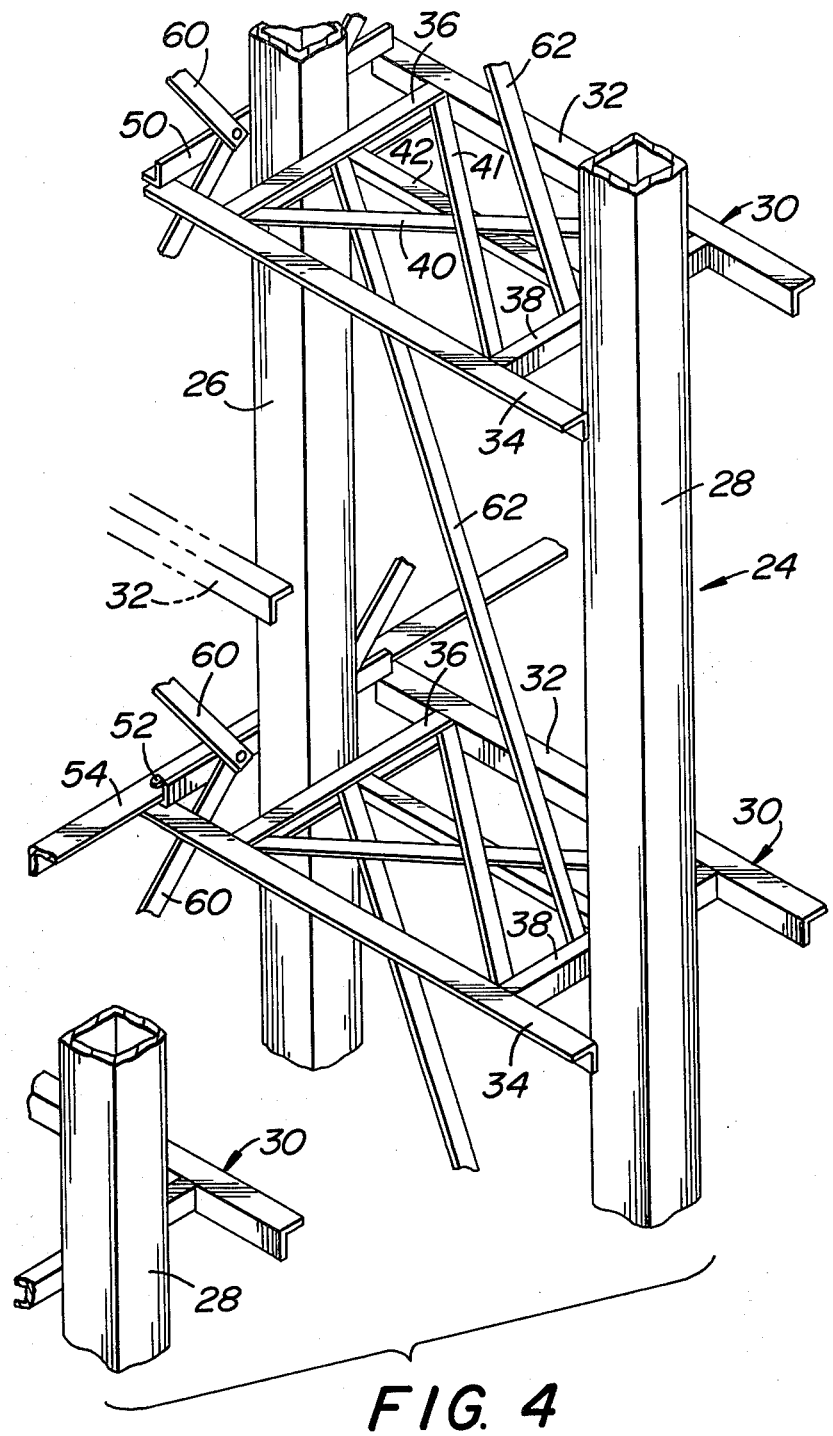
FIG. 4 is an isometric view of a pair of frame members as shown in FIGS. 2 and 3.

In FIG. 1 there is shown, in diagrammatic form, a high-rise storage rack comprising four rows 10, 12, 14 and 16 of vertical frames extending between the floor 18 and the roof 20 of a building and arranged to form two aisles 21 and 22. By way of example, the high-rise storage rack shown in FIG. 1 may have a height of about 75 feet and extend in the down-aisle direction a distance to provide seventy bays of storage areas, i.e., perhaps 350 feet.

The pallet engaging mechanism of an automated storage and retrieval system associated with the storage rack shown in FIG. 1 will move through aisle 21 for handling loads supported in the storage bays contained in rows 10 and 12 and will move through aisle 22 for handling the loads supported in the storage bays contained in rows 14 and 16. This arrangement is conventional in the art.

FIGS. 2–5 show the details of the construction of the vertical frames forming row 10. The frames forming rows 12, 14 and 16 are constructed in a similar manner.

Row 10 of the storage rack comprises a plurality of upright or vertical frames such as the frames 24 and 24' each of which has a similar construction wherefore only one will be described in detail hereafter. Vertical frame 24 comprises a vertically extending rear column 26 located adjacent the rear end of frame 24 and a vertically extending front column 28 located adjacent the front end of frame 24 and facing the aisle 21.

Each vertical frame 24 has a plurality of braced frame assemblies 30 which are spaced apart equally along the vertical extent of the frame 24 a distance to define the vertical dimension of a load area (FIG. 5). The braced frame assemblies 30 are constructed and arranged to perform two important functions, namely, (1) to provide the load rails for supporting the pallets containing the stored loads, and (2) to brace an associated front column against down-aisle forces and lateral column buckling.

To this end, each braced frame assembly 30 comprises a pair of load rails 32 and 34 extending horizontally between the front and rear of the vertical frame 24 and spaced apart so as to be located on opposite sides of front and rear columns 26 and 28 as is apparent in the Drawings. Each braced frame assembly 30 comprises a rear load arm 36 secured at a medial portion thereof to rear column 26 and secured at its ends to load rails 34 and 36 and a front load arm 38 secured at a medial portion thereof to front column 28 and secured at its ends to load rails 32 and 34.

Load rails 32 and 34 and load arms 36 and 38 are made of angle members and are arranged as shown in the Drawings to provide a flat surface for supporting a pallet load. Load rails 32 and 34 and load arms 36 and 38 are welded together by conventional welding techniques to form a strong, rigid structure having a generally rectangular shape. Each braced frame assembly 30 also comprises a pair of cross-frame braces 40, 41 extending diagonally between the corners of the rectangular structure and welded at the ends thereof to the load rails 36 and 38. Cross-frame braces 40, 41 are made of flat members and function to resist tension forces along their length.

Each braced frame assembly 30 also comprises a horizontal brace member 42 extending horizontally between the medial portions of load rails 36 and 38 to be in alignment with the columns 26 and 28. Horizontal brace member 42 is made of an angle member to provide additional rigidity to the braced frame assembly 30 and to resist compressive forces.

The rear columns 26 of the vertical frames forming the row 10 are braced against down-aisle forces and lateral column buckling by means of down-aisle tie means which extend between the rear columns of the vertical frames at appropriate vertically spaced locations. For clarity of illustration only one rear down-aisle tie means is shown in the Drawings. In an actual storage rack a rear down-aisle tie means is provided at each braced level.

To this end, a rear tie clip 50 is welded to the rear vertical wall of the rear column 26 to extend in the down-aisle direction. Tie clip 50 is provided with a plurality of bolt holes adapted to receive bolts 52 which secure a down-aisle tie member 54 as shown in FIGS. 3 and 4 to the tie clip 50. For additional support, the ends of the tie clips 50 are welded to the rear ends of the load rails 32 and 34.

Adjacent vertical frames such as frames 24 and 24' are also braced together by a plurality of diagonal braces 60 which are bolted at their ends to the tie clips 50 as is best shown in FIGS. 4 and 5.

The braced frame assemblies 30 are also secured together in the vertical direction by means of diagonal braces 62 which are welded at their ends to the load rails 30 and 32 at a medial location adjacent the horizontal braces 42 as is best shown in FIG. 4. Braces 62 provide cross-aisle stability to the frame.

The manner in which a braced frame assembly 30 in accordance with the invention functions under loading is illustrated in FIG. 6. This Figure is a force distribution diagram showing the action of the principal members of a braced frame assembly 30 when subjected to loading such as the force indicated at "F". The force "F" could be due to various factors, such as an earthquake force, a moving equipment impact force, or a column buckling force.

In response to a loading provided by a force "F" acting toward the left as shown in FIG. 6, the load arm 38 is placed in compression, with load rail 32 being placed in compression and load rail 34 being placed in tension. The cross frame brace 40 is placed in tension with the other cross frame brace 41 being placed in a slack condition. The down-aisle tie 54 is placed under a bending load.

It will be apparent that if a force were applied in the direction opposite to that of force "F" (i.e., to the right as viewed in FIG. 6), the load arm 38 would again be placed in tension, but all the other members would have opposite loads placed thereon. Thus, load rail 32 would be placed in tension and load rail 34 would be placed in compression, with diagonal brace 41 being placed in tension and diagonal brace 40 being placed in a slack condition.

It will thus be apparent that the braced frame assemblies 30 of the invention provide a very effective bracing action under all loading conditions.

It will be apparent that the front columns of adjacent vertical frames 24 and 24' provide a complete clearance space to permit the unobstructed entry of the pallet engaging mechanism of an automated storage and retrieval system for engaging a pallet or the like supported on the load rails 32 and 34 between the adjacent vertical frames. This clearance is best shown in FIG. 5 wherein it can be seen that the only obstruction in the vertical direction is that provided by the vertical height of the braced frame assemblies 30. This overcomes the major disadvantage of the prior art construction which utilizes down-aisle ties extending across the front columns and requiring excess clearance space as compared with the novel arrangement of the invention.

The design also achieves the various advantages and features discussed hereinbefore.

It will be apparent that various changes may be made in the construction and arrangement of parts without departing from the scope of the invention. Thus, for example, the two cross-frame braces 40, 41 may be replaced by a single diagonal made strong enough to withstand both the tension and compression forces involved.

What is claimed is:

1. In a high rise storage rack for supporting loads on pallets or the like to be handled by a pallet engaging mechanism of an automated storage and retrieval system, said storage rack having a plurality of individual vertical frames spaced apart in the down-aisle direction and extending laterally between a rear end of the frame and a front end of the frame adjacent an aisle through which the automated storage and retrieval system operates, each of said vertical frames comprising a vertically extending rear column located adjacent the rear end of the frame and a vertically extending front column located adjacent the front end of the frame, said storage rack also including a plurality of down-aisle tie means extending between the rear columns of said vertical frames to brace the same against down-aisle forces and lateral column buckling, the improvement comprising:

a plurality of braced frame assemblies on each of said vertical frames, said braced frame assemblies being spaced apart vertically on said vertical frames to extend horizontally between said front and rear columns at a plurality of load supporting levels, the braced frame assemblies on each vertical frame being located in horizontal alignment with braced frame assemblies on adjacent down-aisle vertical frames to provide load support at said levels, said braced frame assemblies being secured to said rear and front columns to brace said front column against down-aisle forces and lateral column buckling, each of said braced frame assemblies including a pair of load rails extending horizontally between the front and rear ends of the vertical frame and being spaced apart and located on opposite sides of said front and rear columns for providing a support for the pallets or the like, the front columns of adjacent down-aisle frames providing a complete clearance space therebetween at said load supporting levels of said braced frame assemblies to permit the unobstructed entry of the pallet engaging mechanism of the automated storage and retrieval system for engaging a pallet or the like supported on said load rails of said braced frame assemblies.

2. A storage rack according to claim 1 wherein each of said braced frame assemblies includes a rear load arm secured at a medial portion of said rear load arm to said rear column and supporting said load rails at end portions thereof, and a front load arm secured at a medial portion of said front load arm to said front column and supporting said load rails at end portions thereof.

3. A storage rack according to claim 2 wherein each of said braced frame assemblies includes a pair of cross frame braces extending between said front and rear load arms in a crossed arrangement and being secured at their ends to said front and rear load arms.

4. A storage rack according to claim 3 wherein each of said braced frame assemblies includes a horizontal brace member extending between said front and rear load arms in a path aligned with said front and rear columns and being secured at its ends to said front and rear load arms.

5. A storage rack according to claim 2 wherein each of said braced frame assemblies includes a horizontal brace member extending between said front and rear load arms along a path aligned with said front and rear columns and being secured at its ends to said front and rear load arms.

6. A storage rack according to claim 2 wherein each of said braced frame assemblies includes cross frame brace means extending between said front and rear load arms in a diagonal arrangement.

7. A storage rack according to claim 6 wherein each of said braced frame assemblies includes a horizontal brace member extending between said front and rear load arms in a path aligned with said front and rear columns and being secured at its ends to said front and rear load arms.

* * * * *